US012619191B2

(12) United States Patent
Tachiki

(10) Patent No.: US 12,619,191 B2
(45) Date of Patent: May 5, 2026

(54) IMAGE FORMING APPARATUS INCLUDING A CONTACT AND SEPARATION MECHANISM

(71) Applicant: SHARP KABUSHIKI KAISHA, Sakai City (JP)

(72) Inventor: Hiroshi Tachiki, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/800,487

(22) Filed: Aug. 12, 2024

(65) Prior Publication Data

US 2025/0068121 A1 Feb. 27, 2025

(30) Foreign Application Priority Data

Aug. 23, 2023 (JP) ................................ 2023-135341

(51) Int. Cl.
*G03G 15/01* (2006.01)
*G03G 15/16* (2006.01)
*G03G 21/16* (2006.01)

(52) U.S. Cl.
CPC ....... *G03G 21/168* (2013.01); *G03G 15/0136* (2013.01); *G03G 15/161* (2013.01); *G03G 21/1647* (2013.01)

(58) Field of Classification Search
CPC ............. G03G 15/0136; G03G 15/161; G03G 21/1647; G03G 21/168
See application file for complete search history.

(56) References Cited

U.S. PATENT DOCUMENTS

| | | | | |
|---|---|---|---|---|
| 2010/0080625 | A1 | 4/2010 | Furuya et al. | |
| 2022/0236668 | A1 * | 7/2022 | Kainuma | G03G 15/1615 |
| 2024/0142898 | A1 * | 5/2024 | Yoshikawa | G03G 15/0136 |
| 2024/0337962 | A1 * | 10/2024 | Geshi | G03G 15/0136 |

FOREIGN PATENT DOCUMENTS

JP 2010-085593 A 4/2010

* cited by examiner

*Primary Examiner* — Sophia S Chen
(74) *Attorney, Agent, or Firm* — ScienBiziP, P.C.

(57) ABSTRACT

An image forming apparatus is provided. The image forming apparatus includes multiple photoreceptors, a primary transfer unit attachable to and detachable from an apparatus main body, and a unit lock that restricts the primary transfer unit from being detached from the apparatus main body. The primary transfer unit includes a primary transfer belt, multiple primary transfer rollers, and a contact and separation mechanism. The contact and separation mechanism includes multiple arm members, a link member, and a grip. When, using the grip, a user moves the link member to a release position for separating all of the primary transfer rollers from the photoreceptors, the unit lock transitions from a lock state to an unlock state.

7 Claims, 13 Drawing Sheets

IMAGE FORMING APPARATUS INCLUDING A CONTACT AND SEPARATION MECHANISM

CROSS-REFERENCE TO RELATED APPLICATION

The present application claims priority from Japanese Application JP2023-135341, the content of which is hereby incorporated by reference into this application.

BACKGROUND OF THE INVENTION

1. Field of the Invention

The present disclosure relates to an image forming apparatus and particularly to, for example, an image forming apparatus including a plurality of photoreceptors and a primary transfer unit attachable to and detachable from an apparatus main body.

2. Description of the Related Art

Some examples of conventional image forming apparatuses are known. An image forming apparatus according to related art has a belt unit (primary transfer unit) including: a belt member (primary transfer belt) to which toner images on image carriers (photoreceptors) are transferred, and that is stretched around a plurality of stretching members; transfer members (primary transfer rollers) that transfer the toner images from the image carriers to the belt member; and a position shifting member (contact and separation mechanism) that shifts each transfer member between a contact position where the transfer member makes contact with the corresponding image carrier with the belt member therebetween and a separation position where the transfer member is separated from the corresponding image carrier. The belt unit is attachable to and detachable from an apparatus main body through an opening in a housing of the apparatus main body in a direction perpendicular to an axial direction of the stretching members. This image forming apparatus further has an operation lever provided on an outer side surface of the housing in a manner such that an engagement part of the position shifting member and a mating engagement part of the operation lever can be engaged and disengaged in the axial direction of the stretching members. The operation lever is shiftable between predetermined first and second positions. The operation lever is used to operate the position shifting member so that the transfer members come to the respective contact positions when the operation lever is in the first position and the transfer members come to the respective separation positions when the operation lever is in the second position.

SUMMARY OF THE INVENTION

In the related art, the primary transfer rollers are shifted between the positions where the primary transfer rollers make contact with the photoreceptors with the primary transfer belt therebetween (contact positions) and the positions where the primary transfer rollers are separated from the photoreceptors (separation positions) using the contact and separation mechanism that is operated by moving the operation lever. However, the related art is inconvenient because the operation for contact and separation of the primary transfer rollers using the operation lever and an operation for removal of the primary transfer unit need to be performed separately. The related art is inconvenient also because a user can wrongly detach the primary transfer unit with the primary transfer rollers in the contact positions, which can damage other components such as the photoreceptors and the primary transfer belt.

It is therefore a main object of the present disclosure to provide a novel image forming apparatus.

Another object of the present disclosure is to provide an image forming apparatus that can reliably keep the primary transfer belt separated from the photoreceptors when the primary transfer unit is detached from the apparatus main body.

An image forming apparatus according to a first aspect of the present disclosure includes: a plurality of photoreceptors; a primary transfer unit attachable to and detachable from an apparatus main body; and a unit lock that restricts the primary transfer unit from being detached from the apparatus main body. The primary transfer unit includes a primary transfer belt to which toner images are transferred from the plurality of photoreceptors, a plurality of primary transfer rollers opposed to the respective photoreceptors with the primary transfer belt therebetween, and a contact and separation mechanism that brings the primary transfer rollers into contact with the photoreceptors and separates the primary transfer rollers from the photoreceptors. The contact and separation mechanism includes a plurality of arm members, a link member, and a grip to move the link member and detach the primary transfer unit from the apparatus main body. The arm members rotatably support the respective primary transfer rollers. The link member shifts positions of the arm members by moving between different positions to bring the primary transfer rollers into contact with the photoreceptors and separate the primary transfer rollers from the photoreceptors. The link member is movable back and forth in a direction perpendicular to an axial direction of the primary transfer rollers. The grip is provided at one end of the link member. In conjunction with the user's operation of moving, using the grip, the link member to a release position for separating all of the primary transfer rollers from the photoreceptors, the unit lock is allowed to transition from a locking state to an unlocking state.

According to the first aspect of the present disclosure, all of the primary transfer rollers (and hence the entire primary transfer belt) are separated from the photoreceptors by the user manually moving the link member to the release position using the grip. In this configuration, the unit lock is allowed to transition from the locking state to the unlocking state only after the link member has been moved to the release position. Thus, the primary transfer unit can be prevented from moving before all of the primary transfer rollers are separated from the photoreceptors. It is therefore possible to reliably keep the primary transfer belt separated from the photoreceptors through a simple operation when the primary transfer unit is detached from the apparatus main body.

According to a second aspect of the present disclosure, which is dependent from the first aspect, the link member has a stopper that restricts the unit lock from transitioning from the locking state to the unlocking state, and as the link member moves to the release position, the stopper moves from a restriction position to a restriction release position. The restriction position is a position for restricting the unit lock from transitioning from the locking state to the unlocking state. The restriction release position is a position for releasing the transition restriction.

According to a third aspect of the present disclosure, which is dependent from the first aspect or the second aspect, the unit lock includes a driving-side coupling provided on the apparatus main body and a driven-side coupling provided on the primary transfer unit.

According to a fourth aspect of the present disclosure, which is dependent from the first aspect or the second aspect, the unit lock has a manual operation knob to manually cause the unit lock to transition from the locking state to the unlocking state.

According to a fifth aspect of the present disclosure, which is dependent from the first aspect or the second aspect, the link member has a pusher, and the unit lock has a push receiver that is pushed by the pusher. In conjunction with the user's operation of moving the link member to the release position using the grip, the unit lock is allowed to transition from the locking state to the unlocking state, and the pusher pushes the push receiver to cause the unit lock to transition from the locking state to the unlocking state.

According to a sixth aspect of the present disclosure, which is dependent from the first aspect or the second aspect, the unit lock includes a locking hole, a lock pin, and an urging member. The locking hole is provided in the apparatus main body. The lock pin is provided on the primary transfer unit. The lock pin is movable back and forth, to be engaged with the locking hole. The urging member urges the lock pin in such a direction as to separate the lock pin from the locking hole. In conjunction with the user's operation of moving the link member to the release position using the grip, the unit lock is allowed to transition from the locking state to the unlocking state, and the urging member exerts an urging force to cause the unit lock to transition from the locking state to the unlocking state.

According to a seventh aspect of the present disclosure, which is dependent from the first aspect or the second aspect, when the primary transfer unit is detached from the apparatus main body, the link member is moved to the release position by the user pulling the grip in a direction toward a take-out port of the apparatus main body, so that all of the primary transfer rollers are shifted to respective separation positions where the primary transfer rollers are separated from the photoreceptors, and after all of the primary transfer rollers have been shifted to the respective separation positions, the primary transfer unit is detached from the apparatus main body by the user further pulling the first grip.

The present disclosure makes it possible to reliably keep the primary transfer belt separated from the photoreceptors through a simple operation when the primary transfer unit is detached from the apparatus main body.

The above and other objects, features, and advantages of the present disclosure will become more apparent from the following detailed description of embodiments with reference to the accompanying drawings.

DETAILED DESCRIPTION OF THE INVENTION

First Embodiment

Figure 1:
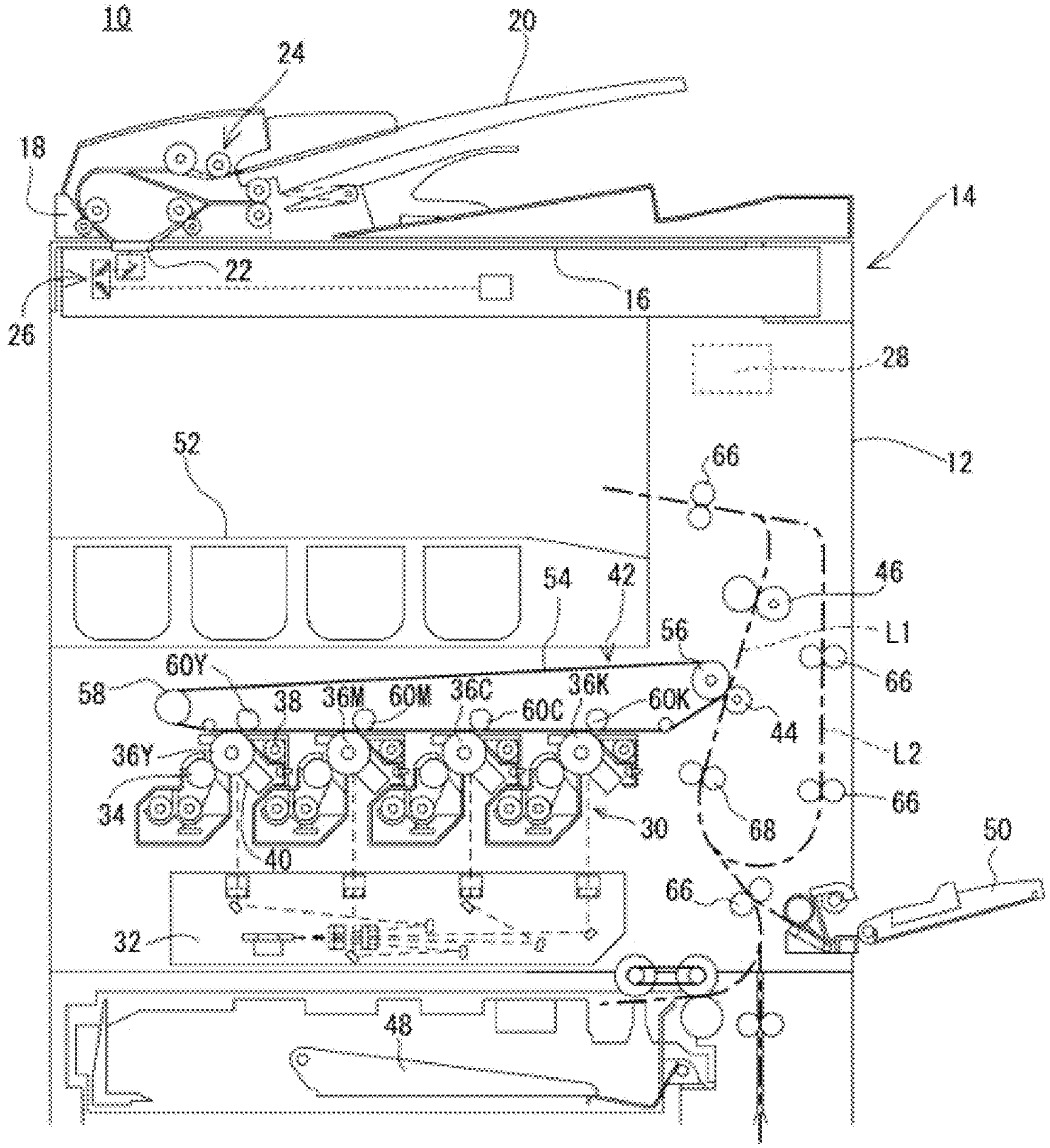
FIG. 1 is a schematic cross-sectional view of an internal structure of an image forming apparatus according to an embodiment of the present disclosure.

Referring to FIG. 1, an image forming apparatus 10 according to one embodiment of the present disclosure is a multifunction peripheral (MFP) having multiple functions such as a copier function, a printer function, a scanner function, and a facsimile machine function, and forms a color image or a monochrome image on a printing sheet by an electrophotographic method. As described in detail below, the image forming apparatus 10 includes a primary transfer belt 54 and a plurality of photoreceptor drums 36 (one example of photoreceptors) provided adjacent to the primary transfer belt 54, and adopts an intermediate transfer system to perform primary transfer of toner images from the photoreceptor drums 36 to the primary transfer belt 54 and perform secondary transfer of the toner images from the primary transfer belt 54 to a printing sheet.

First, the following gives schematic description of a configuration of the image forming apparatus 10. Note that, in this specification, the front-rear direction (depth direction) of the image forming apparatus 10 and components thereof is defined on the assumption that a surface that faces toward a user's standing position, which in other words is a surface provided with an operation unit, not shown, is a front surface (forward surface). Note that the operation unit is located on the near side of the plane in FIG. 1. The left-right direction (lateral direction) of the image forming apparatus 10 and the components thereof is defined from the perspective of the user facing the image forming apparatus 10.

As illustrated in FIG. 1, the image forming apparatus 10 includes an apparatus main body 12 and an image reading device 14 disposed above the apparatus main body 12. The image reading device 14 includes a document placement table 16 made of a transparent material. A document pressing cover 18 is attached to an upper side of the document placement table 16 in an openable and closable manner with the interposition of a hinge or the like. The document pressing cover 18 is provided with an automatic document feeder (ADF) 24 that automatically feeds documents placed on a document placement tray 20 to an image reading position 22, one sheet at a time. Furthermore, the operation unit that receives input operation such as a print instruction by a user is provided on the front surface of the document placement table 16. The operation unit is provided with a display such as a touch panel display, various operation buttons, and the like as appropriate.

The image reading device 14 incorporates an image reader 26 including, for example, a light source, a plurality of mirrors, an imaging lens, and a line sensor. The image reader 26 exposes a document surface to light from the light source and guides light reflected off the document surface to the imaging lens using the plurality of mirrors. Then, the reflected light is imaged on a light receiving element of the line sensor by the imaging lens. The line sensor detects the luminance and the chromaticity of the reflected light imaged on the light receiving element, and image data based on an image on the document surface is generated. For example, a charge coupled device (CCD) or a contact image sensor (CIS) is used as the line sensor.

A controller 28 including a CPU, memory, and the like, an image former 30, and the like are provided in the apparatus main body 12. In response to an input operation to the operation unit by the user, the controller 28 transmits a control signal to each component of the image forming apparatus 10 and causes the image forming apparatus 10 to perform various operations.

The image former 30 includes, for example, an exposure device 32, developing devices 34, the photoreceptor drums 36, cleaner units 38, charging devices 40, a primary transfer unit 42, a secondary transfer unit 44, and a fusing unit 46. The image former 30 forms an image on a printing sheet conveyed from a sheet feed cassette 48 or a manual sheet feed tray 50 and discharges the printing sheet on which the image has been formed to a sheet discharge tray 52. As the image data for forming the image on the printing sheet, image data read by the image reader 26, image data transmitted from an external computer, or image data otherwise obtained is used.

Image data that is handled by the image forming apparatus 10 corresponds to a color image in four colors including black (K), cyan (C), magenta (M), and yellow (Y). Accordingly, four developing devices 34, four photoreceptor drums 36, four cleaner units 38, and four charging devices 40 are provided to form four different latent images corresponding to the respective colors, constituting four image stations (also referred to as process units). The four image stations are arranged in a line along the moving direction (circulation direction) of the surface of the primary transfer belt 54 in order of black, cyan, magenta, and yellow from the downstream side in the moving direction of the primary transfer belt 54, which in other words is, from the side closer to the secondary transfer unit 44. However, the arrangement order of the colors may be changed as appropriate.

Note that the letters K, C, M, and Y added to reference numerals are each intended to indicate a color for which identified elements are provided. The letters K, C, M, and Y indicate black, cyan, magenta, and yellow, respectively. For example, the reference numeral 36K in FIG. 1 indicates that the identified photoreceptor drum is for black, and the reference numeral 60K indicates that the identified primary transfer roller is for black. However, in the description of the components, the components are collectively described by omitting the letters K, C, M, and Y, provided that it is not particularly necessary to distinguish the components in terms of the color for which the components are provided.

The photoreceptor drums 36 are each an image carrier including an electrically conductive cylindrical sleeve (base body) and a photosensitive layer formed on a surface of the sleeve. Each photoreceptor drum 36 is rotatable around an axis thereof. The charging devices 40 are each a component that charges the surface of the corresponding photoreceptor drum 36 to a predetermined potential. The exposure device 32 is configured as a laser scanning unit (LSU) including a laser emitter, a reflection mirror, and the like, and forms electrostatic latent images based on image data on the surfaces of the photoreceptor drums 36 by exposing the surfaces of the charged photoreceptor drums 36 to light. The developing devices 34 visualize the electrostatic latent images formed on the surfaces of the photoreceptor drums 36 using toners in four colors (Y, M, C, and K). The cleaner units 38 each remove toner remaining on the surface of the corresponding photoreceptor drum 36 after development and image transfer.

The primary transfer unit 42 includes, for example, the primary transfer belt 54, a drive roller 56, a driven roller 58, four primary transfer rollers 60, and a contact and separation mechanism 62 (see FIG. 2), and is disposed above the photoreceptor drums 36. Note that the primary transfer unit 42, the primary transfer belt 54, and the primary transfer rollers 60 are also referred to as an intermediate transfer unit, an intermediate transfer belt, and intermediate transfer rollers, respectively.

The primary transfer belt 54 is an endless strip-shaped belt stretched around a plurality of stretching rollers in such a manner as to be movable to circulate in a predetermined circulation direction (anticlockwise direction in FIG. 1). The primary transfer belt 54 is disposed with an outer circumferential surface thereof (lower surface) along the plurality of photoreceptor drums 36 provided adjacent thereto. The plurality of stretching rollers include, for example, the drive roller 56 and the driven roller 58. Each of the stretching rollers is disposed with a shaft thereof extending in the front-rear direction. In image formation, the outer circumferential surface of the primary transfer belt 54 is kept in contact with the surfaces of the photoreceptor drums 36.

The drive roller 56 can be rotationally driven around an axis thereof by a driver, not shown. A driven-side coupling 114 (see FIG. 3) is provided at a rear end of a roller shaft of the drive roller 56. The driven-side coupling 114 and a driving-side coupling 112 (see FIG. 16) provided on the apparatus main body 12 are coupled, so that a rotational driving force from a drive source is transmitted to the drive roller 56. As the drive roller 56 is rotationally driven, the primary transfer belt 54 moves to circulate in the predetermined circulation direction. The driven roller 58 is driven to rotate by the circular movement of the primary transfer belt 54, and gives constant tension to the primary transfer belt 54 to prevent loosening of the primary transfer belt 54.

The primary transfer rollers 60 are each a component for transferring a toner image formed on the corresponding photoreceptor drum 36 onto the primary transfer belt 54 (primary transfer), and are disposed in positions opposite to the respective photoreceptor drums 36 for the respective colors with the primary transfer belt 54 therebetween. When a primary transfer current is supplied to a primary transfer roller 60, a transfer electric field is formed at a primary transfer position between the corresponding photoreceptor drum 36 and the primary transfer belt 54. The toner image formed on the photoreceptor drum 36 is transferred onto the outer circumferential surface of the primary transfer belt 54 by the action of the transfer electric field formed at this primary transfer position.

The position of each primary transfer roller 60 is shiftable in a direction toward or away from the corresponding photoreceptor drum 36 (up-down direction) by the contact and separation mechanism 62. The primary transfer belt 54 is brought in contact with or separated from the photoreceptor drums 36 through the positional shift of the primary transfer rollers 60. A specific configuration of the contact and separation mechanism 62 is described below.

The secondary transfer unit 44 includes a secondary transfer roller for transferring the toner images formed on the primary transfer belt 54 onto a printing medium, and is disposed opposite to the drive roller 56 with the primary transfer belt 54 therebetween. A printing sheet passes through a secondary transfer nip part between the secondary transfer roller and the primary transfer belt 54. As a result, the toner images formed on the primary transfer belt 54 are transferred onto the printing sheet.

The fusing unit 46 includes a heat roller and a pressure roller, and is disposed above the secondary transfer unit 44. The heat roller is set to a predetermined fusing temperature. The printing sheet passes through a nip region (fusing nip part) between the heat roller and the pressure roller. As a result, the toner images transferred onto the printing sheet are heated and pressed, and thus thermally fixed onto the printing sheet.

In the apparatus main body 12, a first sheet conveyance path L1 is formed to send a printing sheet from the sheet feed cassette 48 or the manual sheet feed tray 50 to the sheet discharge tray 52 via a registration roller 68, the secondary transfer unit 44 (secondary transfer nip part), and the fusing unit 46. Furthermore, a second sheet conveyance path L2 is formed to return the printing sheet that has gone through printing on a front side thereof and that has passed through the fusing unit 46 to the first sheet conveyance path L1 at a location upstream of the secondary transfer unit 44 in the sheet conveyance direction when double-sided printing is performed on the printing sheet. The first sheet conveyance path L1 and the second sheet conveyance path L2 are provided with a plurality of conveyance rollers 66 as appropriate for applying auxiliary propulsion force to the printing sheet.

The following describes a specific configuration of the contact and separation mechanism 62 included in the primary transfer unit 42. Note that the primary transfer belt 54 is not shown in FIGS. 2 to 7 to facilitate understanding of the structure of the primary transfer unit 42. Furthermore, a portion of a front frame 70 is not shown in FIGS. 4 to 7 to facilitate understanding of operation of the contact and separation mechanism 62.

Figure 2:
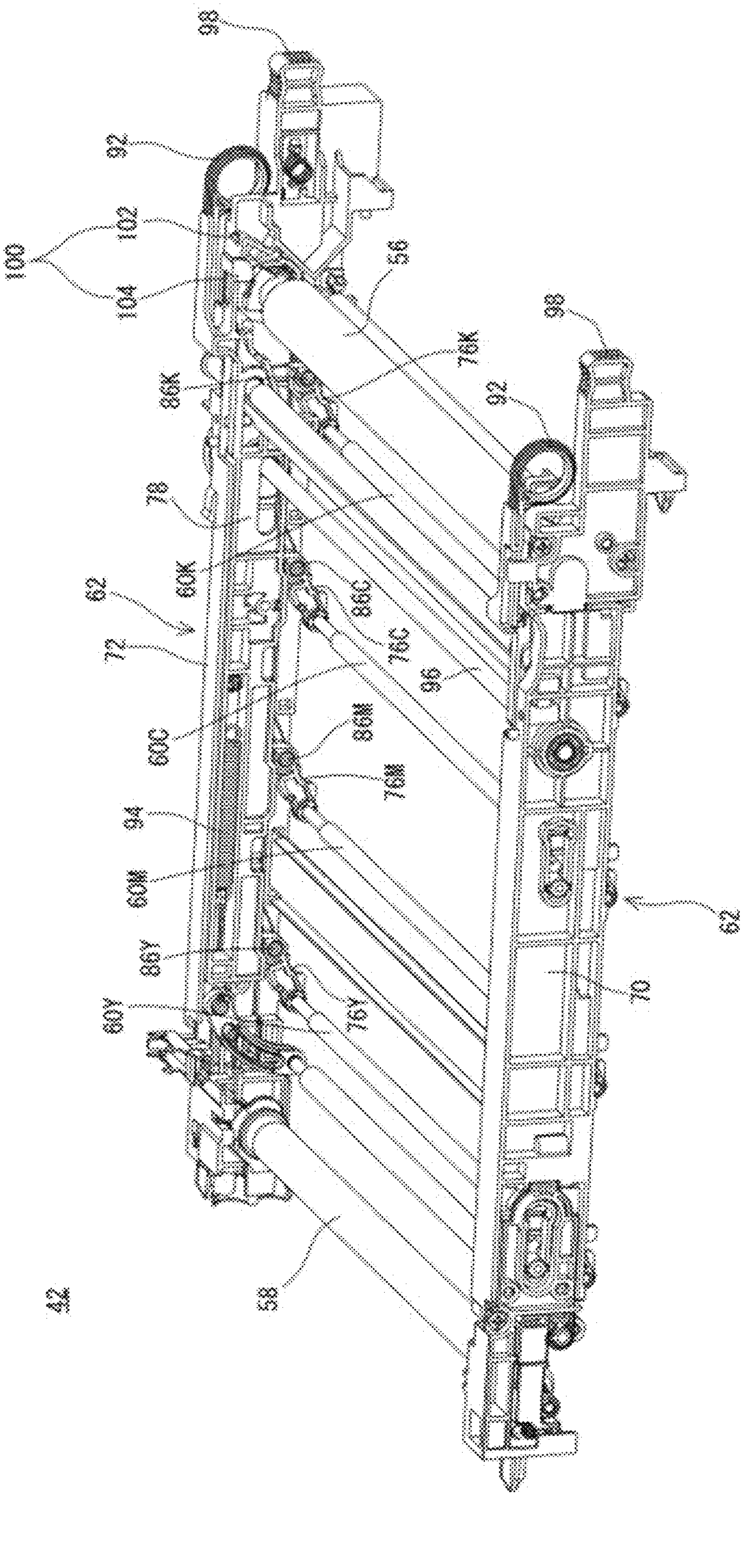
FIG. 2 is a perspective view illustrating a primary transfer unit without showing a primary transfer belt.
Figure 3:
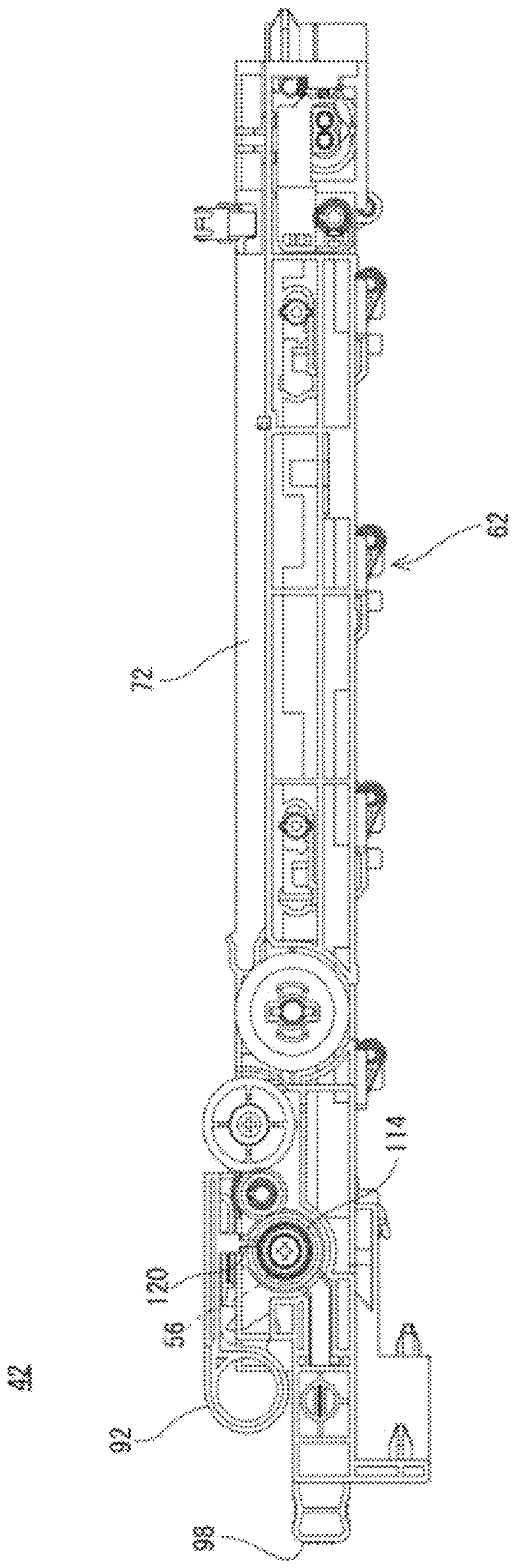
FIG. 3 is a rear view of the primary transfer unit.
Figure 4:
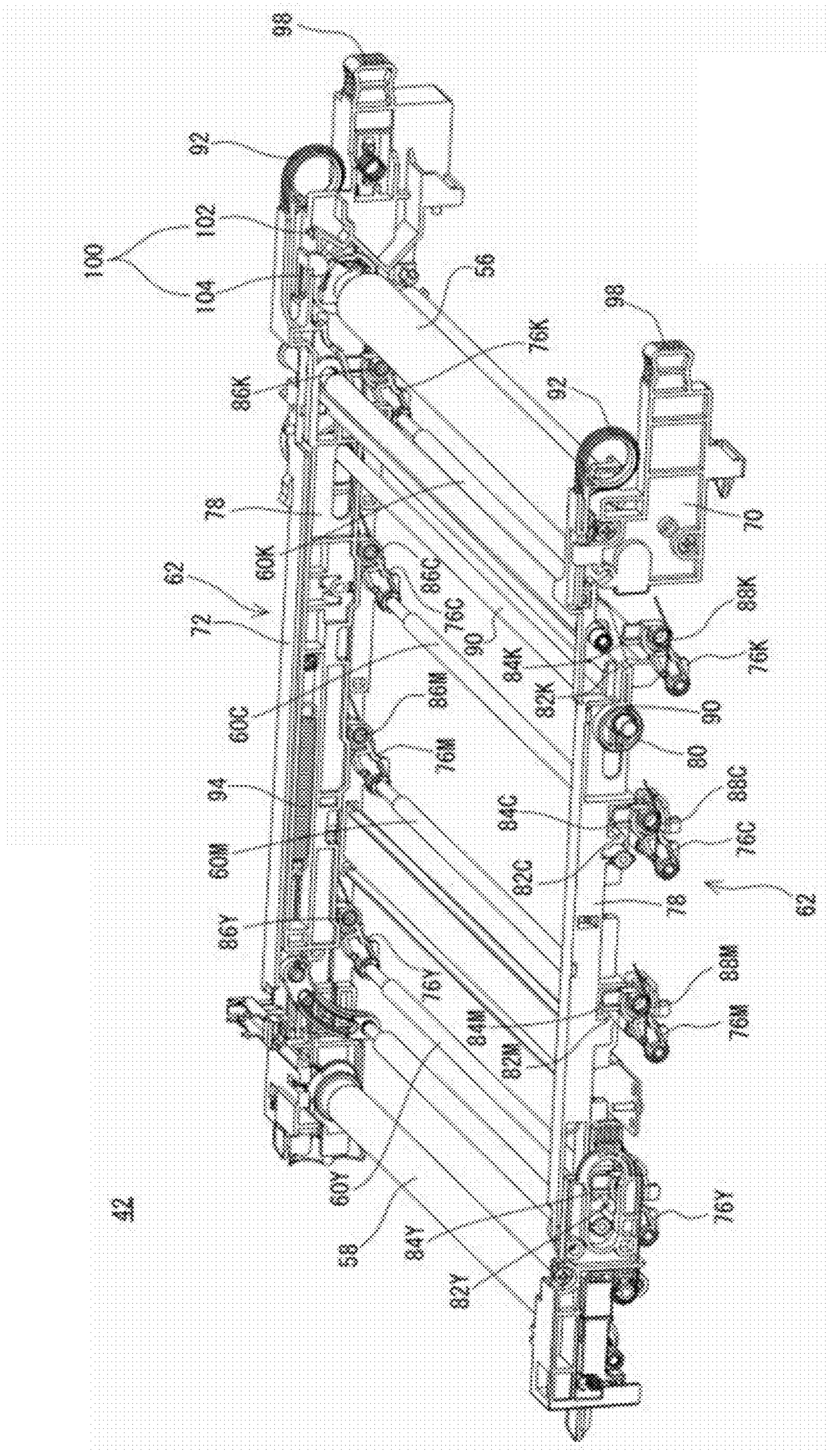
FIG. 4 is a perspective view illustrating the primary transfer unit without showing the primary transfer belt and a portion of a front frame.

As shown in FIGS. 2 to 4, the primary transfer unit 42 includes, for example, the primary transfer belt 54, the drive roller 56, the driven roller 58, the four primary transfer rollers 60, and the contact and separation mechanism 62. These components are each directly or indirectly held in a predetermined arrangement by the front frame 70 and a rear frame 72 (also referred to collectively as "unit frames 70 and 72") having a substantially rectangular plate shape extending in the left-right direction (direction perpendicular to the axial direction of the stretching rollers such as the drive roller 56).

The primary transfer unit 42 is attachable to and detachable from the apparatus main body 12. In the present embodiment, although not shown, a right door is provided in the right side surface of the apparatus main body 12, and opening the right door opens a take-out port and exposes first grips 92 and second grips 98 provided at the right end of the primary transfer unit 42 to the outside. The primary transfer unit 42 can be detached from the apparatus main body 12 by gripping the first grips 92 and pulling the primary transfer unit 42 in a direction toward the take-out port (rightward). That is, the primary transfer unit 42 is laterally pulled out in the right direction from the take-out port of the apparatus main body 12. On the other hand, the primary transfer unit 42 can be attached to the apparatus main body 12 by inserting a left portion of the primary transfer unit 42 into the apparatus main body 12, and then gripping the second grips 98 and pushing the primary transfer unit 42 leftward to an attachment position.

The contact and separation mechanism 62 is provided to bring the primary transfer rollers 60 (and hence the primary transfer belt 54) into contact with the photoreceptor drums 36 and separate the primary transfer rollers 60 from the photoreceptor drums 36. The primary transfer belt 54 is brought into contact with and separated from the photoreceptor drums 36 through the positional shift of the primary transfer rollers 60 to respective contact positions (pressing positions) where the primary transfer rollers 60 press the inner circumferential surface of the primary transfer belt 54 to bring the primary transfer belt 54 and the photoreceptor drums 36 into contact with each other, and to respective separation positions where the primary transfer rollers 60 stop pressing the primary transfer belt 54 to separate the primary transfer belt 54 and the photoreceptor drums 36 from each other. That is, each of the primary transfer rollers 60 can be shifted to the contact position where the primary transfer roller 60 makes contact with the corresponding photoreceptor drum 36 with the primary transfer belt 54 therebetween and to the separation position where the primary transfer roller 60 is separated from the corresponding photoreceptor drum 36. In the present embodiment, the primary transfer rollers 60Y, 60M, and 60C for the non-black colors are integrally shifted in conjunction with each other, and the primary transfer roller 60K for black can be shifted independently of the primary transfer rollers 60Y, 60M, and 60C for the non-black colors.

For example, in a color printing mode (see FIG. 5) for forming a color image, all of the primary transfer rollers 60 are placed in the respective contact positions, and all of the photoreceptor drums 36 are brought into contact with the primary transfer belt 54. Then, the toner images in the respective colors formed on the respective photoreceptor drums 36 are sequentially transferred onto the primary transfer belt 54 in a superimposed manner. As a result, a color toner image is formed on the outer circumferential surface of the primary transfer belt 54. In a monochrome printing mode (see FIG. 6) for forming a monochrome image, the primary transfer rollers 60Y, 60M, and 60C for the non-black colors are placed in the respective separation positions, whereas the primary transfer roller 60K for black is placed in the contact position, and only the photoreceptor drum 36K for black is brought into contact with the primary transfer belt 54. Then, a toner image is formed only on the photoreceptor drum 36K for black, and only the black toner image is transferred onto the outer circumferential surface of the primary transfer belt 54. Furthermore, when the primary transfer unit 42 is attached to or detached from the apparatus main body 12 (see FIG. 7), all of the primary transfer rollers 60 are placed in the respective separation positions, and all of the photoreceptor drums 36 are separated from the primary transfer belt 54. Note that, in the present embodiment, the primary transfer roller 60K for black is kept in the contact position in a standby mode (when no image is formed).

Figure 5:
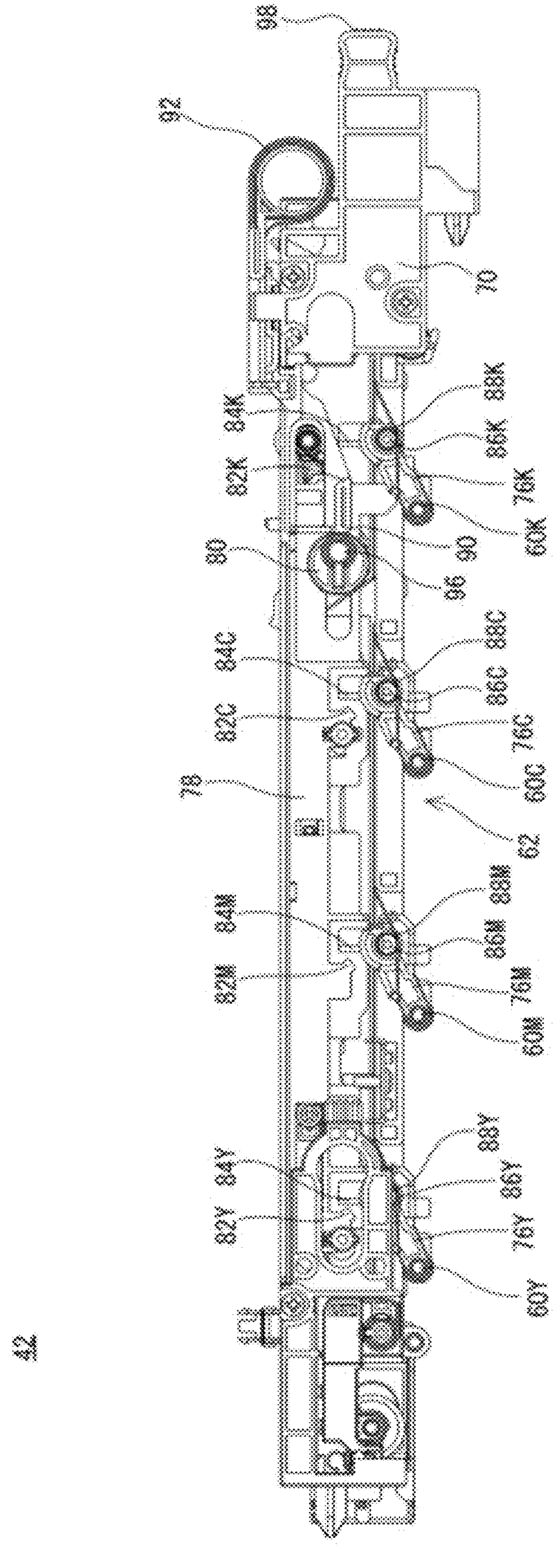
FIG. 5 is a diagram for explaining a contact and separation mechanism for primary transfer rollers, showing a front view of the primary transfer unit in a color printing mode.

Specifically, referring to FIG. 5 together with FIGS. 2 to 4, the contact and separation mechanism 62 includes, for example, four arm members 76, a link member 78, and a cam member 80. Each of the four arm members 76, the link member 78, and the cam member 80 is provided as a pair of a member on the front frame 70 side and a member on the rear frame 72 side. The four pairs of arm members 76 include arm members 76Y, 76M, and 76C for the non-black colors and arm members 76K for black.

Each of the arm members 76 has a substantially L-shape, and one end thereof rotatably supports the corresponding primary transfer roller 60. That is, the arm members 76 function as bearings that rotatably support the primary transfer rollers 60. An opposite end of each arm member 76 has a push receiver 84 formed to receive a pressing force from a corresponding one of pushers 82 formed in the link members 78. A bent part of each arm member 76 is turnably supported by a corresponding one of support protrusions 86 formed on the unit frames 70 or 72. That is, each arm member 76 is turnable about the bent part, and the turning (positional shift) of the arm member 76 causes the corresponding primary transfer roller 60 to move in the up-down direction (come into contact with or separate from the corresponding photoreceptor drum 36).

Each of the support protrusions 86 that support the arm members 76 is provided with a first urging member 88 such as a torsion spring that urges the corresponding arm member 76. The first urging member 88 urges the arm member 76 in such a direction as to cause the corresponding primary transfer roller 60 to move downward, which in other words is, toward the corresponding photoreceptor drum 36 (anticlockwise direction in FIG. 4).

The link members 78 have a substantially rectangular plate shape extending in the left-right direction, and are provided on the inner surfaces of the unit frames 70 and 72 (the rear surface of the front frame 70 and the front surface of the rear frame 72) in such a manner as to be movable back and forth in the longitudinal direction thereof (left-right direction). That is, the movement direction of the link members 78 is the same as the attachment/detachment direction of the primary transfer unit 42. The pushers 82 formed in the link members 78 for pushing and shifting the arm members 76 are each located on the left side of the push receiver 84 of the corresponding arm member 76. The link members 78 further have a wall 90 formed on the right side of the cam members 80 described below for receiving a pressing force from the cam members 80.

Each of the first grips 92, which are used when the user detaches the primary transfer unit 42 from the apparatus main body 12, is provided at the right end (one end) of the corresponding link member 78. No particular limitations are placed on the shape of the first grips 92. In the present embodiment, the first grips 92 have a ring shape so that the user can easily put fingers through the first grips 92. Furthermore, second urging members 94 such as extension coil springs for urging the link members 78 are provided at the left end (opposite end) of the pair of link members 78. Each of the second urging members 94 is fixed to the unit frame 70 or 72 at one end thereof and is fixed to the link member 78 at an opposite end thereof. The link members 78 are urged leftward (toward a color printing position described below) by the second urging members 94.

As described in detail below, such link members 78 shift the positions of the arm members 76 by moving between different positions to bring the primary transfer rollers 60 into contact with the photoreceptor drums 36 and separate the primary transfer rollers 60 from the photoreceptor drums 36. The link members 78 according to the present embodiment are movable back and forth between three positions, a color printing position (see FIG. 5), a monochrome printing position (see FIG. 6), and a release position (free position; see FIG. 7) in the stated order from the leftmost position.

The cam members 80 are components for pressing and causing the back-and-forth movement of the link members 78, and are attached to opposite ends of a cam shaft 96, which is rotatably held by the unit frames 70 and 72. A drive motor, not shown, is coupled to the cam shaft 96, and the cam members 80 rotate through the rotation of the cam shaft 96 driven by a driving force of the drive motor. The drive motor is a general-purpose motor such as a stepping motor and is controlled by the controller 28. Each of the cam members 80 is, for example, a plate cam, and the distance between the outer circumferential surface thereof and the cam shaft 96 changes depending on the phase (rotation angle) of the cam member 80. As described in detail below, the cam members 80 according to the present embodiment cause the back-and-forth movement of the link members 78 between the color printing position and the monochrome printing position on the basis of instructions from the controller 28.

Each of the second grips 98, which are used when the user attaches the primary transfer unit 42 to the apparatus main body 12, is provided at the right end (one end) of the corresponding unit frame 70 or 72.

In the primary transfer unit 42 including such a contact and separation mechanism 62, as described above, the positions of the primary transfer rollers 60 are shifted depending on three situations, i.e., in the color printing mode, in the monochrome printing mode, and where the primary transfer unit 42 is attached or detached. The positions of the primary transfer rollers 60 are shifted through the movement of the link members 78 to any of the color printing position, the monochrome printing position, and the release position. Specifically, when the link members 78 are in the color printing position, all of the primary transfer rollers 60 are in contact with the photoreceptor drums 36 with the primary transfer belt 54 therebetween. When the link members 78 are in the monochrome printing position, the primary transfer roller 60K for black is in contact with the photoreceptor drum 36K for black with the primary transfer belt 54 therebetween, and the primary transfer rollers 60Y, 60M, and 60C for the non-black colors are separated from the photoreceptor drums 36Y, 36M, and 36C for the non-black colors, respectively. When the link members 78 are in the release position, all of the primary transfer rollers 60 are separated from the photoreceptor drums 36.

In the present embodiment, the cam members 80 receive a driving force from a drive source to rotate in response to an instruction from the controller 28, thereby causing the back-and-forth movement of the link members 78 (and hence the primary transfer rollers 60) between the color printing position and the monochrome position. On the other hand, the movement of the link members 78 from the color printing position or the monochrome printing position to the release position is caused by the user's manual operation using the first grips 92. As described above, the position of the primary transfer roller 60K for black is shifted through the user's manual operation rather than through driving control. This configuration makes it possible to simplify the contact and separation mechanism 62 and to reduce costs. The following describes specific operation of the contact and separation mechanism 62.

As shown in FIG. 5, in the color printing mode, each of the cam members 80 rotates as appropriate in accordance with an instruction from the controller 28 and is kept at a phase that allows for the minimum distance between the outer circumferential surface thereof and the cam shaft 96. Furthermore, the link members 78 are kept in the color printing position, which is the leftmost position, by an urging force of the second urging members 94. When the link members 78 are in the color printing position, each pusher 82 of the link members 78 is separated from the push receiver 84 of the corresponding arm member 76, and each arm member 76 keeps the corresponding primary transfer roller 60 in the contact position using the urging force of the corresponding first urging member 88.

Figure 6:
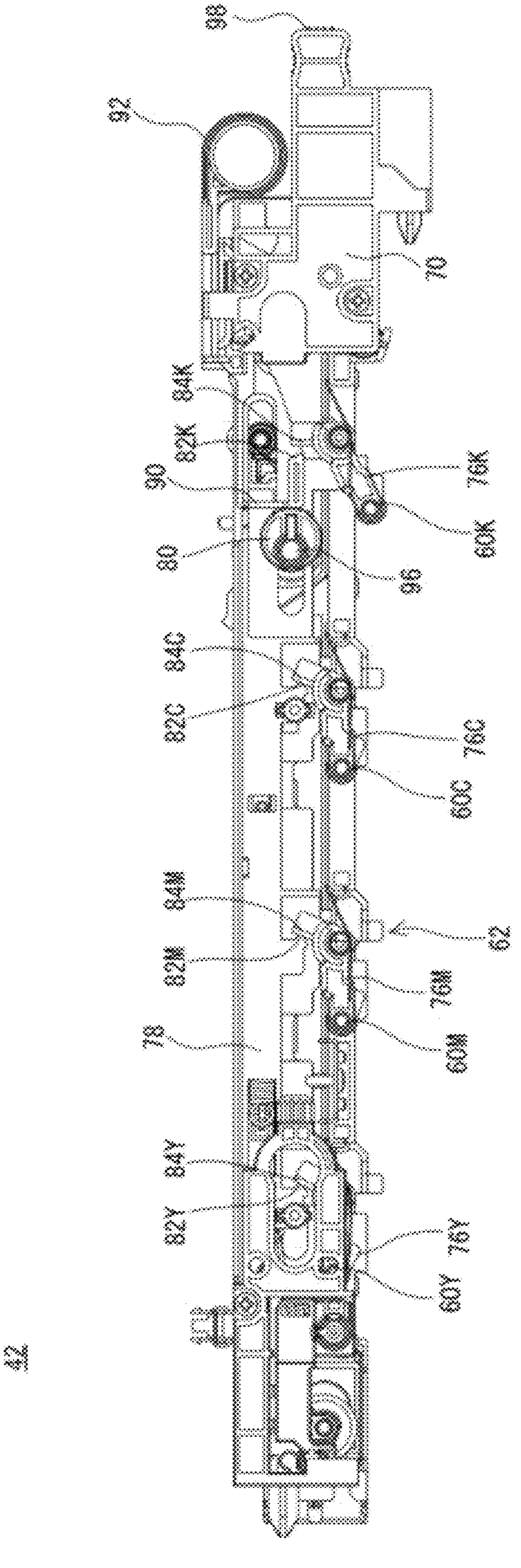
FIG. 6 is a diagram for explaining the contact and separation mechanism for the primary transfer rollers, showing a front view of the primary transfer unit in a monochrome printing mode.

As shown in FIG. 6, in the monochrome printing mode, each of the cam members 80 rotates as appropriate in accordance with an instruction from the controller 28 and is kept at a phase that allows for the maximum distance between the outer circumferential surface thereof and the cam shaft 96. The link members 78 move to the monochrome printing position against the urging force of the second urging members 94 as a result of the wall 90 being pushed rightward by the cam members 80. When the link members 78 are in the monochrome printing position, the pushers 82K for black of the link members 78 are separated from the push receivers 84K of the arm members 76K for black, and the arm members 76K for black keep the primary transfer roller 60K for black in the contact position. Meanwhile, the pushers 82Y, 82M, and 82C for the non-black colors of the link members 78 push the push receivers 84Y, 84M, and 84C of the arm members 76Y, 76M, and 76C for the non-black colors rightward. As a result, the arm members 76Y, 76M, and 76C for the non-black colors rotate in such a direction as to raise the primary transfer rollers 60Y, 60M, and 60C for the non-black colors (clockwise direction in FIG. 5), so that each of the primary transfer rollers 60Y, 60M, and 60C for the non-black colors is separated from the corresponding one of the photoreceptor drums 36Y, 36M, and 36C for the non-black colors.

In this case, the distance by which the primary transfer rollers 60Y, 60M, and 60C for the non-black colors and the photoreceptor drums 36Y, 36M, and 36C for the non-black colors are separated is set to the minimum necessary distance (first distance) to separate the primary transfer belt 54 from the photoreceptor drums 36Y, 36M, and 36C for the non-black colors. This is because the following problem occurs if the separation distance between the primary transfer rollers 60Y, 60M, and 60C for the non-black colors and the respective photoreceptor drums 36Y, 36M, and 36C for the non-black colors is longer. That is, shifting the primary transfer rollers 60Y, 60M, and 60C for the non-black colors back to the respective contact positions (changing the mode from the monochrome printing mode to the color printing mode) at high speed is likely to result in a loud noise due to the impact, and doing so at low speed takes long.

Figure 7:
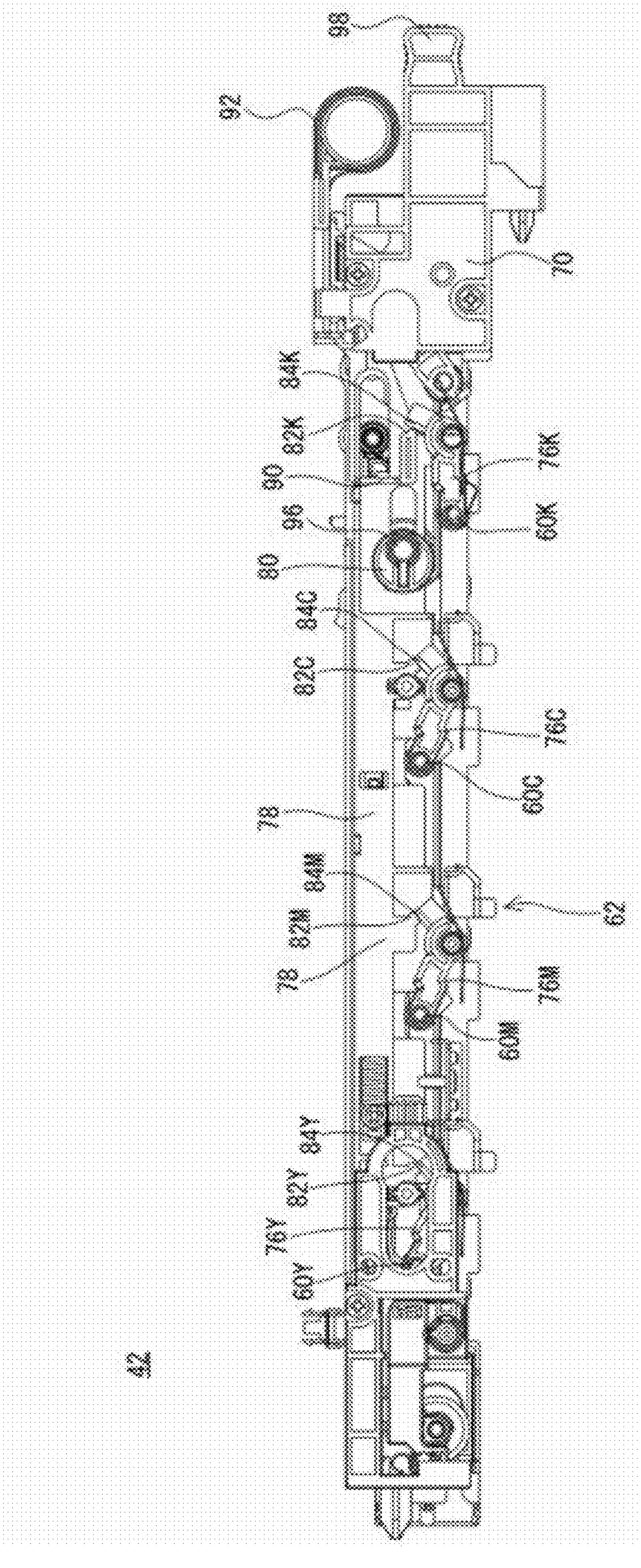
FIG. 7 is a diagram for explaining the contact and separation mechanism for the primary transfer rollers, showing a front view of the primary transfer unit in a situation where the primary transfer unit is attached or detached.

As shown in FIG. 7, when the primary transfer unit 42 is detached from the apparatus main body 12, the user pulls the first grips 92 in the direction toward the take-out port of the apparatus main body 12 (rightward), so that the link members 78 move from the color printing position or the monochrome printing position to the release position. When the link members 78 are in the release position, the pushers 82K for black of the link members 78 push the push receivers 84K of the arm members 76K for black rightward, so that the arm members 76K for black rotate in such a direction as to raise the primary transfer roller 60K for black (clockwise direction in FIG. 7). As a result, the primary transfer roller 60K for black is separated from the photoreceptor drum 36K for black.

When the link members 78 move from the color printing position or the monochrome printing position to the release position, the pushers 82Y, 82M, and 82C for the non-black colors of the link members 78 push the push receivers 84Y, 84M, and 84C of the arm members 76Y, 76M, and 76C for the non-black colors further rightward. As a result, the positions of the primary transfer rollers 60Y, 60M, and 60C for the non-black colors are shifted further upward. The separation distance between the primary transfer rollers 60Y, 60M, or 60C for the non-black colors and the respective photoreceptor drums 36Y, 36M, or 36C for the non-black colors changes to a second distance, which is longer than the first distance. This allows the primary transfer belt 54 to be retracted from the photoreceptor drums 36 to a greater extent, making it possible to more reliably prevent the primary transfer belt 54 from being damaged due to interference with the photoreceptor drums 36 or other components when the primary transfer unit 42 is detached from the apparatus main body 12.

The primary transfer unit 42 is detached from the apparatus main body 12 by the user further pulling the first grips 92 in the direction toward the take-out port after the link members 78 have moved to the release position. That is, in the present embodiment, the primary transfer roller 60K for black is separated from the photoreceptor drum 36K for black, and the primary transfer rollers 60Y, 60M, and 60C for the non-black colors are separated from the respective photoreceptor drums 36Y, 36M, and 36C for the non-black colors by the second distance longer than the first distance in conjunction with the manual operation of detaching the primary transfer unit 42 using the first grips 92.

Figure 8:
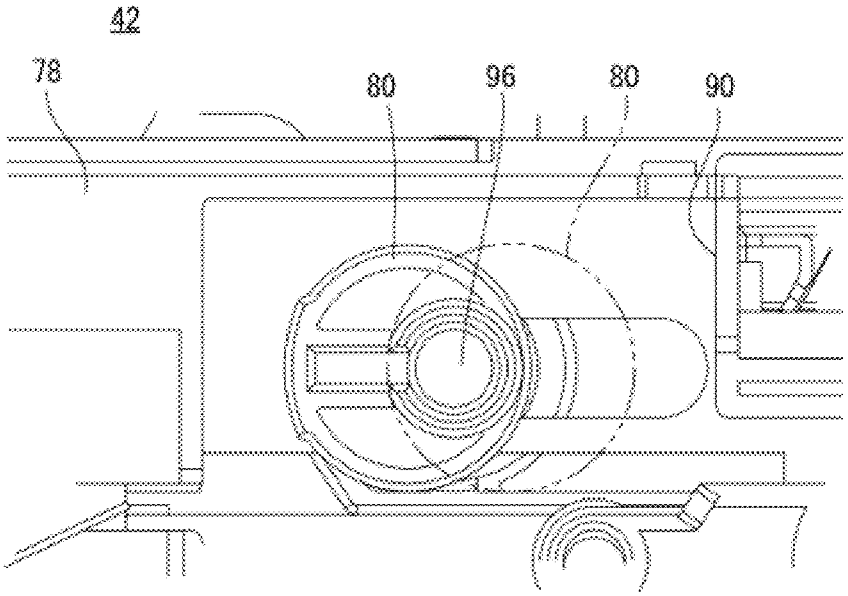
FIG. 8 is a diagram illustrating a cam member of the primary transfer unit and the vicinity thereof.

Furthermore, in the present embodiment, the link members 78 and the cam members 80 are configured to be out of contact with each other when the link members 78 are in the release position as shown in FIGS. 7 and 8 regardless of the phase (rotation angle) of the cam members 80. This configuration makes it possible to prevent the link members 78 and the cam members 80 from receiving load and being damaged even if the cam members 80 are accidentally rotated when the link members 78 are in the release position.

Figure 9:
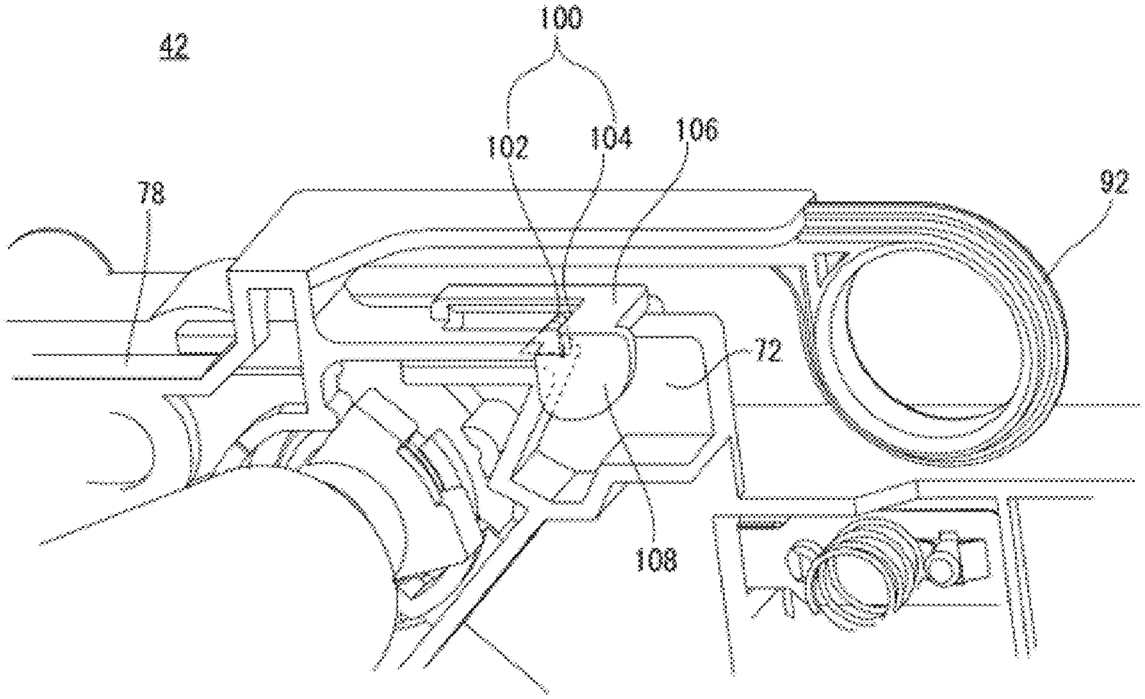
FIG. 9 is a diagram illustrating a lock mechanism of the primary transfer unit and the vicinity thereof.

Furthermore, as will be well understood from FIG. 9, the primary transfer unit 42 in the present embodiment includes link member lock mechanisms 100 (stoppers) that restrict the link members 78 from moving leftward due to the urging force of the second urging members 94 when the link members 78 are in the release position. That is, the link member lock mechanisms 100 restrict the link members 78 from returning from the release position to the color printing position or the monochrome printing position.

Specifically, each of the link member lock mechanisms 100 includes a first engaging part 102 provided at the right end of the unit frame 70 or 72 and a second engaging part 104 provided at the right end of the corresponding link member 78. The first engaging part 102 is a triangular locking protrusion and protrudes upward from the upper surface of the unit frame 70 or 72. The first engaging part 102 (locking protrusion) has an inclined surface that is a slope rising toward the right as the left side surface and has a stopper surface extending in a substantially vertical direction as the right side surface. A protruding piece 106 that is elastically deformable in the up-down direction is formed at the right end of each link member 78. The second engaging part 104 is a rectangular locking hole formed in the protruding piece 106.

When the link members 78 are in the release position, an inner edge of each second engaging part 104 locks onto the stopper surface of the corresponding first engaging part 102, and thus restricts the corresponding link member 78 from moving leftward. The restriction by the link member lock mechanisms 100 (engagement between each first engaging part 102 and the corresponding second engaging part 104) can be released by slightly lifting the protruding pieces 106. In the present embodiment, fan-shaped release parts 108 are provided, which each protrude from an end of the corresponding protruding piece 106 in a downward-right direction. Closing the right door after attaching the primary transfer unit 42 to the apparatus main body 12 with the link members 78 in the release position causes portions of the inner surface of the right door (for example, portions of a frame of the secondary transfer unit 44 attached to the right door) to make contact with the release parts 108, and thus raise the protruding pieces 106. As a result, the restriction by the link member lock mechanisms 100 is released, so that the link members 78 automatically move from the release position to the monochrome printing position or the color printing position. However, the link member lock mechanisms 100 do not need to have the release parts 108, and the user may manually release the restriction by the link member lock mechanisms 100 by lifting the protruding pieces 106.

Figure 10:
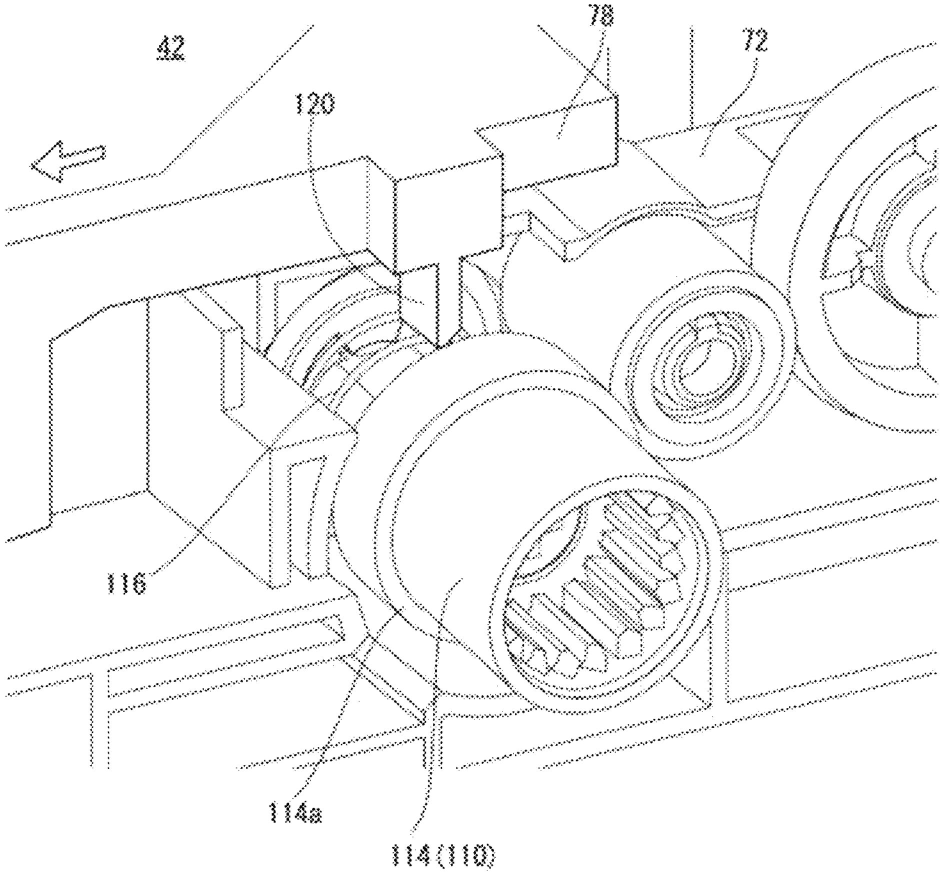
FIG. 10 is a diagram illustrating a unit lock restricted from transitioning by a stopper of link members.

Furthermore, as will be well understood from FIG. 10, the image forming apparatus 10 includes a unit lock 110 that restricts the primary transfer unit 42 from being detached from the apparatus main body 12. The unit lock 110 is configured to be allowed to transition from a locking state to an unlocking state in conjunction with the user's operation of moving the link members 78 from the color printing position or the monochrome printing position to the release position using the first grips 92, which in other words is the user's operation of moving the link members 78 to the release position for separating all of the primary transfer rollers 60 from the photoreceptor drums 36. The following gives detailed description of the unit lock 110.

In the present embodiment, the unit lock 110 includes the driving-side coupling 112 (see FIG. 16) provided on the apparatus main body 12 and the driven-side coupling 114 provided at the rear end of the drive roller 56 in the primary transfer unit 42. That is, in the present embodiment, the couplings 112 and 114 for transmitting the rotational driving force from the drive source to the drive roller 56 are used as the unit lock 110.

The driven-side coupling 114 is movable back and forth in the axial direction of the drive roller 56 (front-rear direction). The driven-side coupling 114 is urged rearward, which in other words is in a direction for engagement (coupling) with the driving-side coupling 112, by a third urging member 116 such as a helical compression spring. The outer surface of the driven-side coupling 114 has a step to have an increased diameter at the front end thereof (an end away from the driving-side coupling 112), and this annular step is used as a manual operation knob 114*a* for manually disengaging the driven-side coupling 114 from the driving-side coupling 112 (i.e., for canceling the locking state of the unit lock 110).

When the primary transfer unit 42 is in place in the apparatus main body 12, as described above, the driving-side coupling 112 and the driven-side coupling 114 are in engagement with each other, and thus the rotational driving force is transmitted from the drive source to the drive roller 56. The driving-side coupling 112 and the driven-side coupling 114 being in engagement with each other (i.e., the unit lock 110 being in the locking state) restricts the primary transfer unit 42 from being detached from the apparatus main body 12. The driving-side coupling 112 and the driven-side coupling 114 can be disengaged (i.e., the unit lock 110 can be put into the unlocking state) by the user moving the driven-side coupling 114 frontward, which in other words is in a direction away from the driving-side coupling 112, using the manual operation knob 114*a*.

However, in the present embodiment, the link members 78 have, in a position corresponding to the driven-side coupling 114, a stopper 120 that restricts the unit lock 110 from transitioning from the locking state to the unlocking state. The stopper 120 moves back and forth between a restriction position for restricting the unit lock 110 from transitioning from the locking state to the unlocking state and a restriction release position for releasing the transition restriction, as the link members 78 move back and forth.

Figure 11:
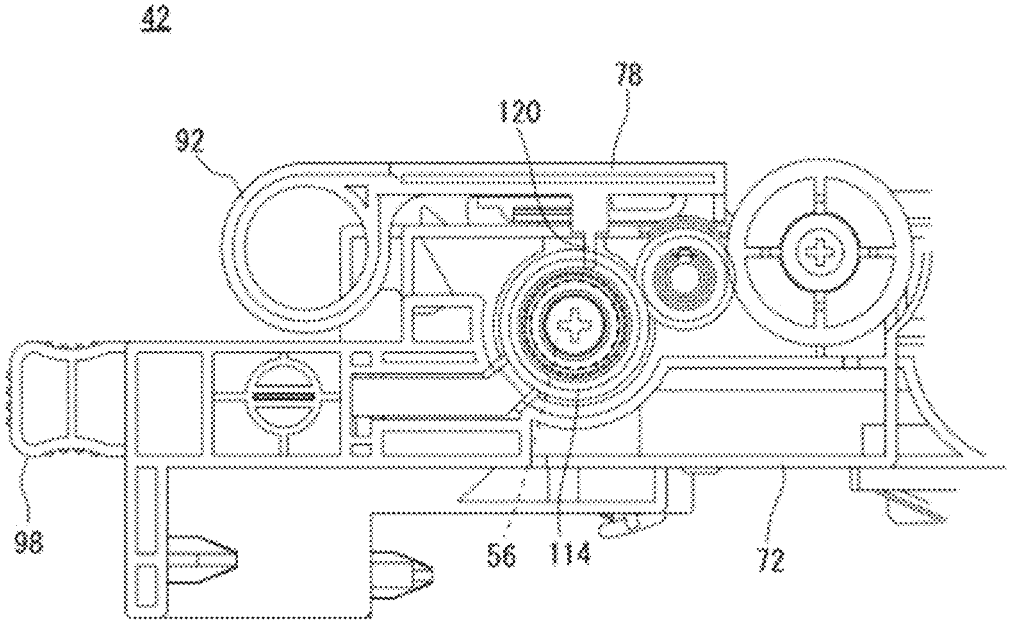
FIG. 11 is a diagram illustrating a driven-side coupling for the primary transfer unit and the vicinity thereof in the color printing mode.
Figure 12:
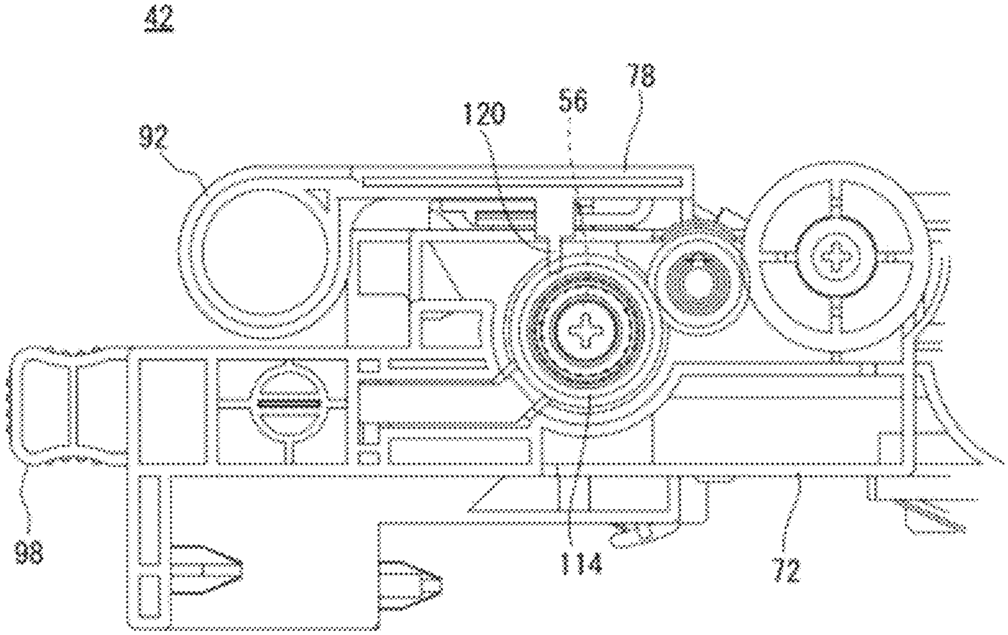
FIG. 12 is a diagram illustrating the driven-side coupling for the primary transfer unit and the vicinity thereof in the monochrome printing mode.

Specifically, when the link members 78 are in the color printing position shown in FIG. 11 or in the monochrome printing position shown in FIG. 12, which in other words is when at least one of the primary transfer rollers 60 is in the contact position, the stopper 120 is in the restriction position, locking onto the front end surface of the driven-side coupling 114 as shown in FIG. 10. Thus, the driven-side coupling 114 is restricted from moving frontward, and the unit lock 110 is restricted from transitioning from the locking state to the unlocking state. As such, as long as at least one of the primary transfer rollers 60 is in the contact position, the unit lock 110 stays in the locking state (disabled to unlock). Thus, the primary transfer unit 42 is reliably prevented from being removed from the apparatus main body 12 with any of the primary transfer rollers 60 in the contact position.

Figure 13:
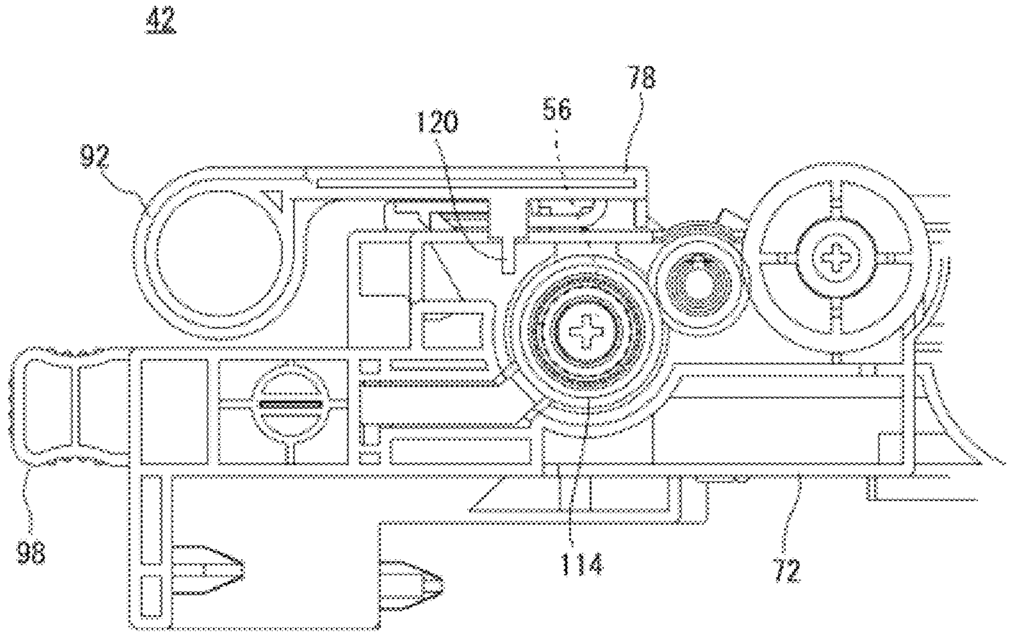
FIG. 13 is a diagram illustrating the driven-side coupling for the primary transfer unit and the vicinity thereof in a situation where the primary transfer unit is attached or detached.
Figure 14:
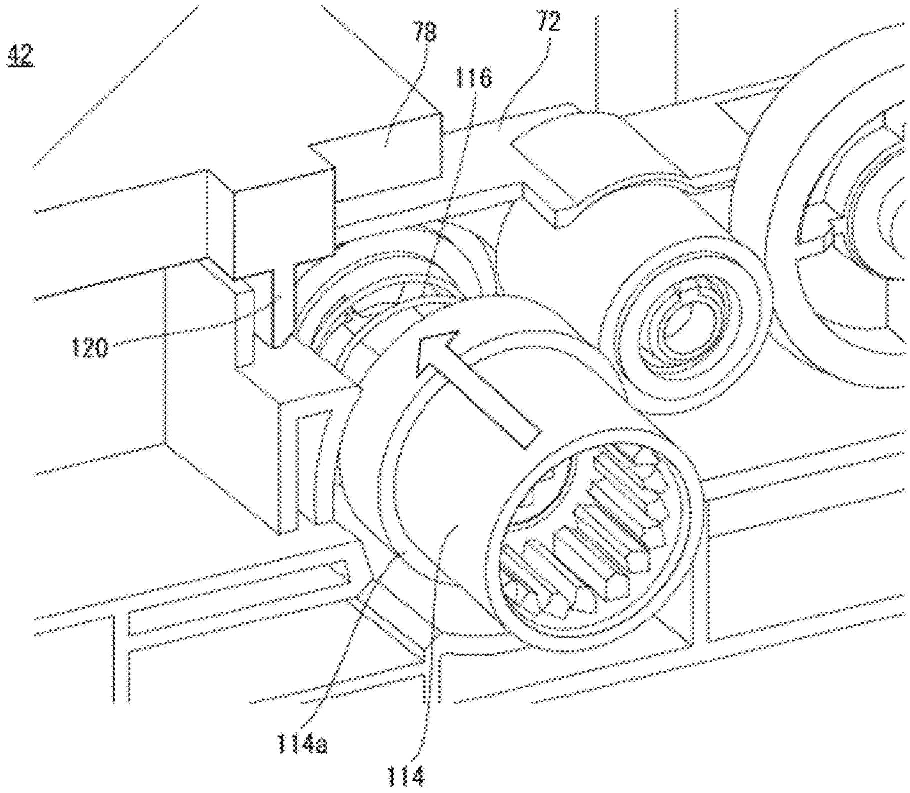
FIG. 14 is a diagram illustrating the unit lock for which the transition restriction by the stopper of the link members has been released.
Figure 15:
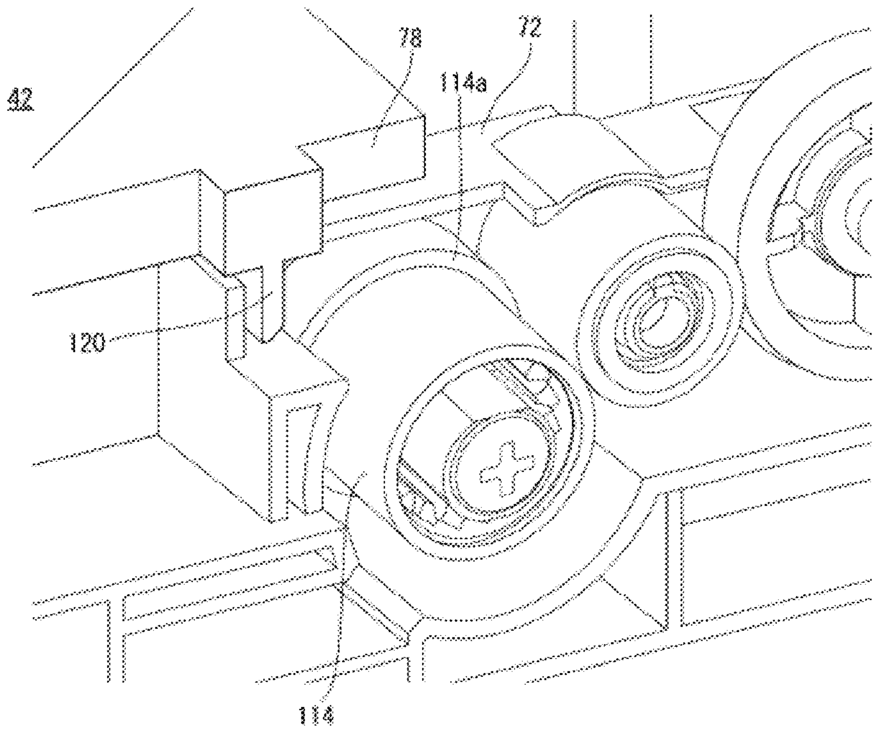
FIG. 15 is a diagram illustrating the unit lock in an unlocking state.

On the other hand, once the link members 78 have moved from the color printing position or the monochrome printing position to the release position, which in other words is when all of the primary transfer rollers 60 are in the respective separation positions, the stopper 120 is in the restriction release position where the stopper 120 is out of contact with the front end surface of the driven-side coupling 114 as shown in FIGS. 13 and 14. Thus, the transition restriction on the unit lock 110 from the locking state to the unlocking state is released. Consequently, the user can put the unit lock 110 into the unlocking state by moving the driven-side coupling 114 frontward as shown in FIG. 15 using the manual operation knob 114*a*.

That is, in the present embodiment, when the primary transfer unit 42 is detached from the apparatus main body 12, the link members 78 are moved to the release position by the user pulling the first grips 92 in the direction toward the take-out port, so that all of the primary transfer rollers 60 are shifted to the respective separation positions. The primary transfer unit 42 is detached from the apparatus main body 12 by the user further pulling the first grips 92. However, pulling the first grips 92 does not allow the unit lock 110 to reach the unlocking state until the link members 78 reach the release position. Thus, the primary transfer unit 42 can be prevented from moving before all of the primary transfer rollers 60 are separated from the photoreceptor drums 36.

As described above, according to the first embodiment, all of the primary transfer rollers 60 (and hence the entire primary transfer belt 54) are separated from the photoreceptor drums 36 by the user manually moving the link members 78 to the release position using the first grips 92. In this configuration, the unit lock 110 is allowed to transition from the locking state to the unlocking state only after the link members 78 have been moved to the release position. Thus, the primary transfer unit 42 can be prevented from moving before all of the primary transfer rollers 60 are separated from the photoreceptor drums 36. It is therefore possible to reliably keep the primary transfer belt 54 separated from the photoreceptor drums 36 through a simple operation when the primary transfer unit 42 is detached from the apparatus main body 12.

Furthermore, since all of the primary transfer rollers 60 are separated from the photoreceptor drums 36 in conjunction with the manual operation of detaching the primary transfer unit 42 from the apparatus main body 12, the above-described configuration eliminates the need for a special operation to separate the primary transfer rollers 60 from the photoreceptor drums 36, improving convenience.

Second Embodiment

Figure 16:
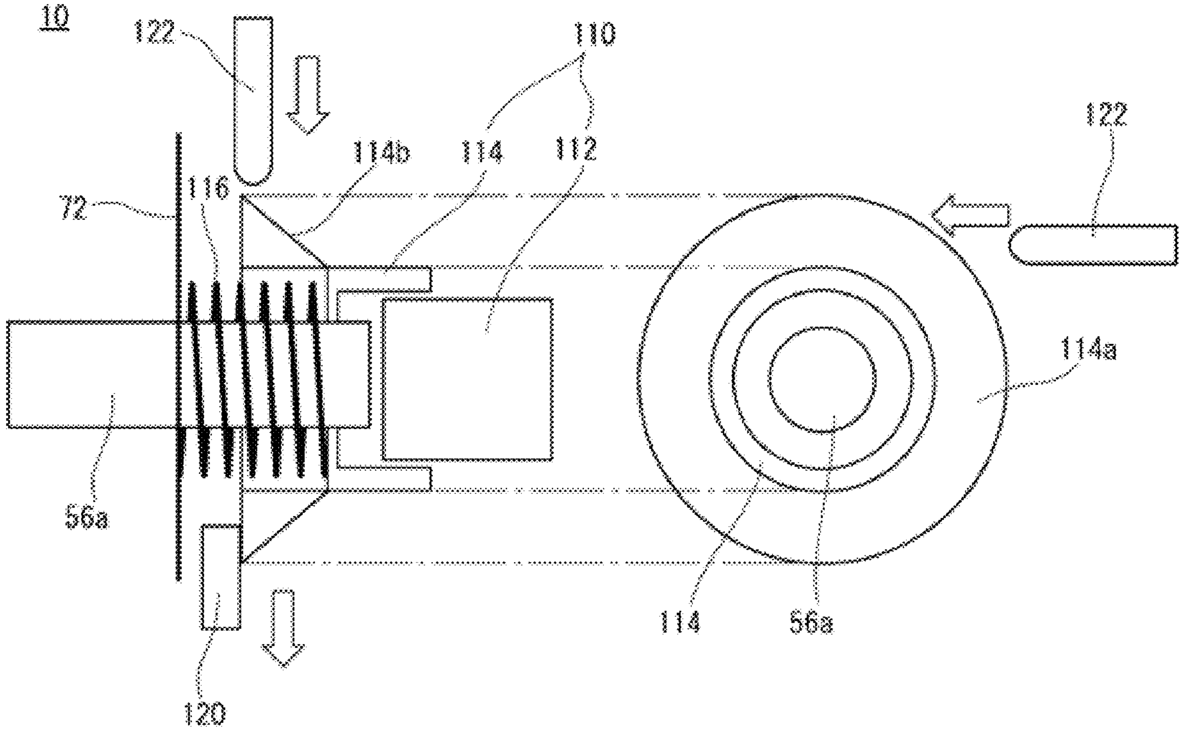
FIG. 16 is a diagram schematically illustrating a unit lock included in an image forming apparatus according to a second embodiment.
Figure 17:
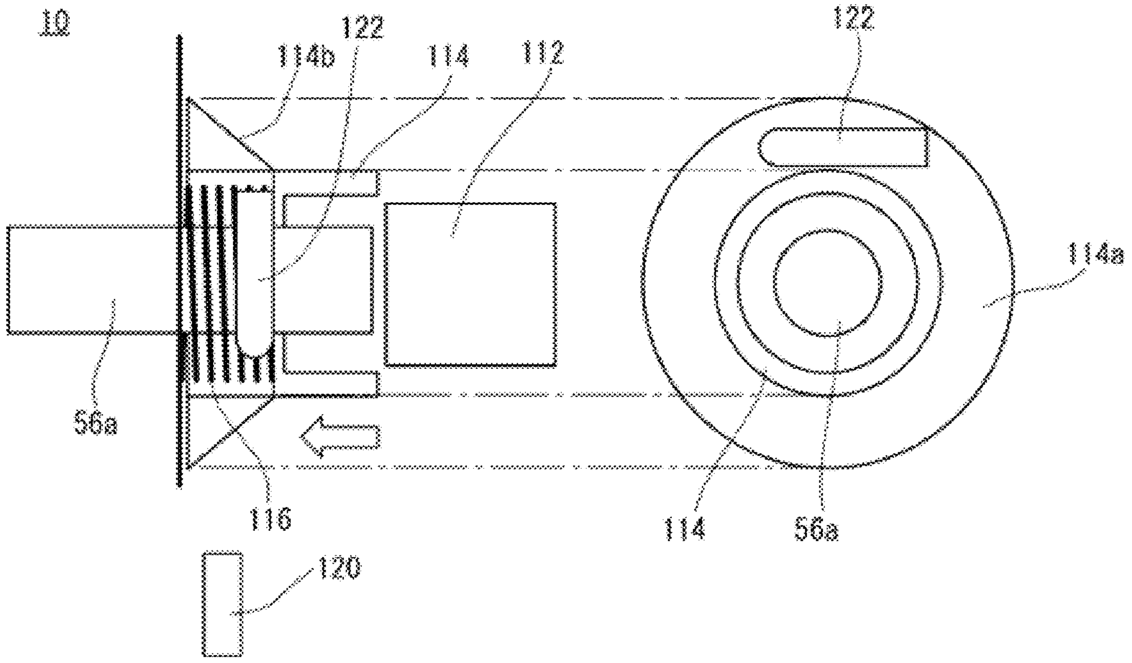
FIG. 17 is a diagram schematically illustrating the unit lock shown in FIG. 16 in an unlocking state.

The following describes an image forming apparatus 10 according to a second embodiment of the present disclosure with reference to FIGS. 16 and 17. The second embodiment differs from the first embodiment described above in that the unit lock 110 in the second embodiment automatically transitions to the unlocking state when the user moves the link members 78 to the release position using the first grips 92. Other than that, the second embodiment has the same configuration as the first embodiment. Accordingly, elements of configuration common to the first and second embodiments are marked using the same reference numerals, and description thereof is omitted or simplified to avoid repetition.

As illustrated in FIGS. 16 and 17, the link members 78 have a pusher 122 located leftward (toward the inner side in the detachment direction of the primary transfer unit 42) of the stopper 120 and spaced therefrom by a predetermined angle. The outer surface of the front end of the driven-side coupling 114 (unit lock 110) has a push receiver **114*b* formed to be pushed by the pusher 122. The push receiver 114*b*** has a tapered surface with a diameter decreasing rearward.

As shown in FIG. 16, when the link members 78 are in the color printing position or the monochrome printing position, which in other words is when at least one of the primary transfer rollers 60 is in the contact position, the stopper 120 is in the restriction position, locking onto the front end surface of the driven-side coupling 114. Meanwhile, the pusher 122 is in a position where the pusher 122 is out of contact with the driven-side coupling 114.

When the user moves the link members 78 from the color printing position or the monochrome printing position to the release position using the first grips 92, as shown in FIG. 17, the stopper 120 moves to the restriction release position where the stopper 120 is out of contact with the front end surface of the driven-side coupling 114, and the transition restriction on the unit lock 110 from the locking state to the unlocking state is released. At the same time, the pusher 122 pushes the push receiver **114*b* to move the driven-side coupling 114 frontward, so that the unit lock 110** automatically transitions from the locking state to the unlocking state.

Like the first embodiment, the second embodiment described above also makes it possible to reliably keep the primary transfer belt 54 separated from the photoreceptor drums 36 through a simple operation when the primary transfer unit 42 is detached from the apparatus main body 12. Furthermore, the configuration of the second embodiment allows the unit lock 110 to automatically transition to the unlocking state in conjunction with the manual operation of detaching the primary transfer unit 42 from the apparatus main body 12, further improving convenience.

Third Embodiment

Figure 18:
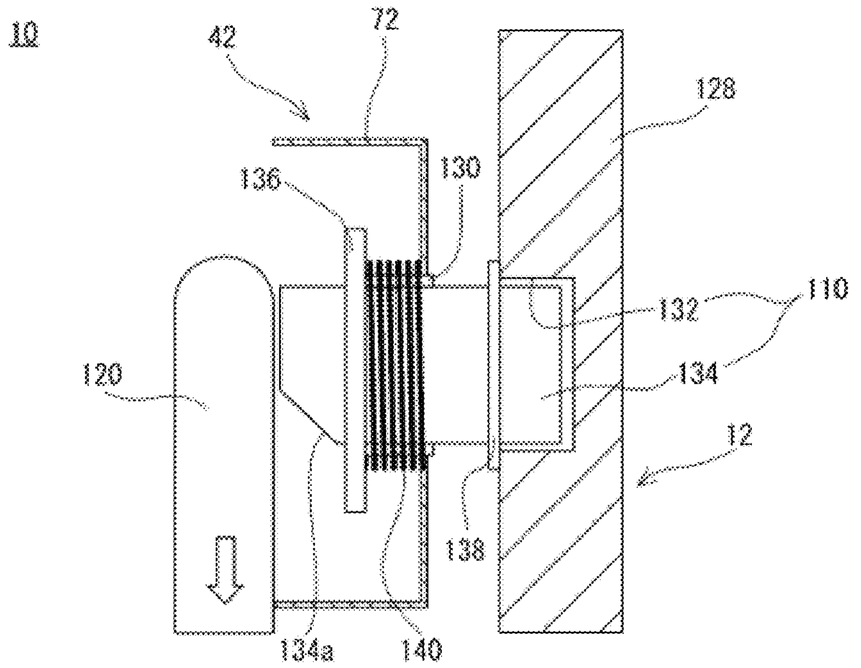
FIG. 18 is a diagram schematically illustrating a unit lock included in an image forming apparatus according to a third embodiment.
Figure 19:
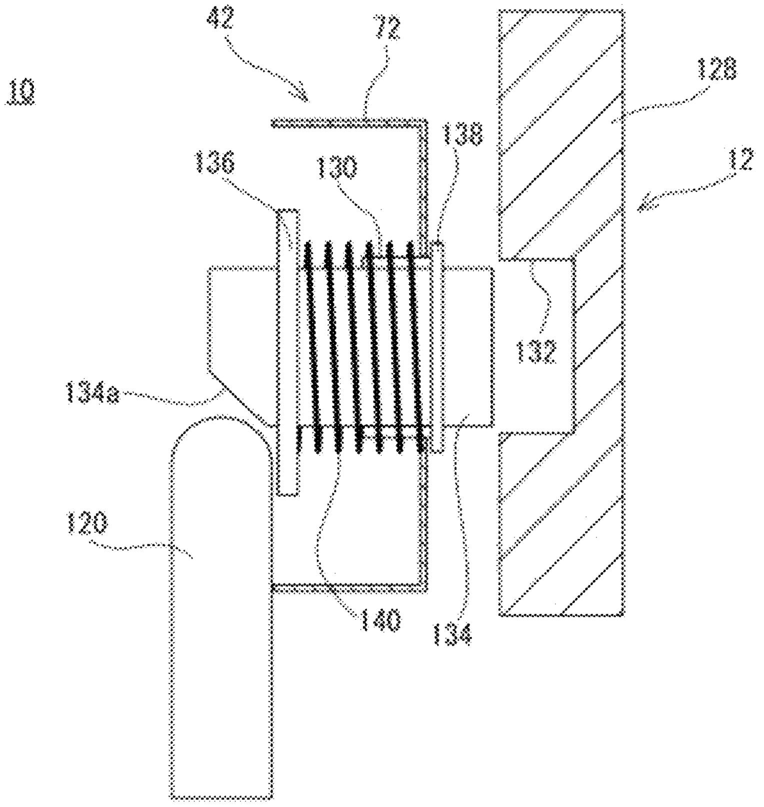
FIG. 19 is a diagram schematically illustrating the unit lock shown in FIG. 18 in an unlocking state.

The following describes an image forming apparatus 10 according to a third embodiment of the present disclosure with reference to FIGS. 18 and 19. The third embodiment differs from the first embodiment described above in that the unit lock 110 in the third embodiment is provided separately from the couplings 112 and 114, and that the unit lock 110 in the third embodiment automatically transitions to the unlocking state when the user moves the link members 78 to the release position using the first grips 92. Other than that, the third embodiment has the same configuration as the first embodiment. Accordingly, elements of configuration common to the first and third embodiments are marked using the same reference numerals, and description thereof is omitted or simplified to avoid repetition.

As illustrated in FIGS. 18 and 19, in the third embodiment, the unit lock 110 includes a locking hole 132 provided in a main body frame 128 of the apparatus main body 12 and a lock pin 134 provided on the primary transfer unit 42. Specifically, the lock pin 134 is supported by a cylindrical support member 130 provided on the rear frame 72 of the primary transfer unit 42 in such a manner as to be movable back and forth in the front-rear direction. The lock pin 134 has a flange-shaped first locking part 136 at the front end thereof and a second locking part 138 such as a retaining ring (C-ring) at the rear end thereof. A fourth urging member 140 such as a helical compression spring is provided between the first locking part 136 and the rear frame 72. The lock pin 134 is urged frontward, which in other words is in such a direction as to separate the lock pin 134 from the locking hole 132, by the fourth urging member 140. The lock pin 134 is prevented from coming frontward out of the locking hole 132 by the second locking part 138 locking onto the support member 130. Furthermore, an inclined surface is formed as a push receiver **134*a* at right corners of the front end of the lock pin 134**.

As shown in FIG. 18, when the link members 78 are in the color printing position or the monochrome printing position, which in other words is when at least one of the primary transfer rollers 60 is in the contact position, the stopper 120 is in a restriction position, locking onto the front end surface of the lock pin 134. Thus, the lock pin 134 is restricted from moving frontward. That is, the unit lock 110 is restricted from transitioning from the locking state to the unlocking state.

As shown in FIG. 19, when the user moves the link members 78 from the color printing position or the monochrome printing position to the release position using the first grips 92, the stopper 120 moves to the restriction release position where the stopper 120 is out of contact with the front end surface of the lock pin 134, and the transition restriction on the unit lock 110 from the locking state to the unlocking state is released. At the same time, the urging force of the fourth urging member 140 urges the lock pin 134 to move frontward, so that the unit lock 110 automatically transitions from the locking state to the unlocking state.

When the primary transfer unit 42 is attached to the apparatus main body 12, the stopper 120 pushes the push receiver 134*a* of the lock pin 134 as the link members 78 move from the release position to the monochrome printing position or the color printing position after the restriction by the link member lock mechanisms 100 has been released as described above. As a result, the lock pin 134 moves rearward, and thus the unit lock 110 automatically transitions from the unlocking state to the locking state.

Like the first embodiment, the third embodiment described above also makes it possible to reliably keep the primary transfer belt 54 separated from the photoreceptor drums 36 through a simple operation when the primary transfer unit 42 is detached from the apparatus main body 12. Furthermore, the configuration of the third embodiment allows the unit lock 110 to automatically transition to the unlocking state in conjunction with the manual operation of detaching the primary transfer unit 42 from the apparatus main body 12, further improving convenience.

The foregoing embodiments have been described using a multifunction peripheral incorporating multiple functions such as a copier function, a facsimile machine function, and a printer function as an example of the image forming apparatus 10. Alternatively, the image forming apparatus 10 may have only one of the functions such as a copier function, a facsimile machine function, or a printer function, or may be a multifunction peripheral incorporating a combination of at least two of the functions.

Furthermore, all of the specific properties of the components such as shapes and dimensions described above are merely examples, and can be changed as appropriate according to, for example, product specifications.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:
- a plurality of photoreceptors;
- a primary transfer unit attachable to, and detachable from, an apparatus main body; and
- a unit lock that restricts the primary transfer unit from being detached from the apparatus main body, wherein: the primary transfer unit includes:
  - a primary transfer belt to which toner images are transferred from the plurality of photoreceptors,
  - a plurality of primary transfer rollers that are positioned, respectively, opposite the plurality of photoreceptors, with the primary transfer belt therebetween, and
  - a contact and separation mechanism that brings the plurality of primary transfer rollers into contact with the plurality of photoreceptors and that separates the plurality of primary transfer rollers from the plurality of photoreceptors, and the contact and separation mechanism includes:
  - a plurality of arm members that rotatably support the plurality of primary transfer rollers, respectively,
  - a link member that shifts positions of the plurality of arm members by moving between different positions to bring the plurality of primary transfer rollers into contact with the plurality of photoreceptors and to separate the plurality of primary transfer rollers from the plurality of photoreceptors, the link member being movable back and forth in a direction perpendicular to an axial direction of the plurality of primary transfer rollers, and
  - a grip to move the link member and detach the primary transfer unit from the apparatus main body, the grip being provided at one end of the link member, such that when a user moves, using the grip, the link member to a release position for separating all of the plurality of primary transfer rollers from the plurality of photoreceptors, the unit lock transitions from a locking state to an unlocking state, wherein the unit lock includes a driving-side coupling provided on the apparatus main body and a driven-side coupling provided on the primary transfer unit.

2. The image forming apparatus according to claim 1, wherein
- the link member has a stopper that restricts the unit lock from transitioning from the locking state to the unlocking state, and
- as the link member moves to the release position, the stopper moves from a restriction position to a restriction release position, the restriction position being a position for restricting the unit lock from transitioning from the locking state to the unlocking state, and the restriction release position being a position for releasing the transition restriction.

3. The image forming apparatus according to claim 1, wherein the unit lock has a manual operation knob to manually cause the unit lock to transition from the locking state to the unlocking state.

4. An image forming apparatus comprising:
- a plurality of photoreceptors;
- a primary transfer unit attachable to, and detachable from, an apparatus main body; and
- a unit lock that restricts the primary transfer unit from being detached from the apparatus main body, wherein: the primary transfer unit includes:
  - a primary transfer belt to which toner images are transferred from the plurality of photoreceptors,
  - a plurality of primary transfer rollers that are positioned, respectively, opposite the plurality of photoreceptors, with the primary transfer belt therebetween, and
  - a contact and separation mechanism that brings the plurality of primary transfer rollers into contact with the plurality of photoreceptors and that separates the plurality of primary transfer rollers from the plurality of photoreceptors, and the contact and separation mechanism includes:
  - a plurality of arm members that rotatably support the plurality of primary transfer rollers, respectively,
  - a link member that shifts positions of the plurality of arm members by moving between different positions to bring the plurality of primary transfer rollers into contact with the plurality of photoreceptors and to separate the plurality of primary transfer rollers from the plurality of photoreceptors, the link member being movable back and forth in a direction perpendicular to an axial direction of the plurality of primary transfer rollers, and a grip to move the link member and detach the primary transfer unit from the apparatus main body, the grip being provided at one end of the link member, such that when a user moves, using the grip, the link member to a release position for separating all of the plurality of primary transfer rollers from the plurality of photoreceptors, the unit lock transitions from a locking state to an unlocking state, wherein the link member has a pusher, the unit lock has a push receiver that is pushed by the pusher, and in conjunction with the user's operation of moving the link member to the release position, the pusher pushes the push receiver to cause the unit lock to transition from the locking state to the unlocking state.

5. The image forming apparatus according to claim 4, wherein, when the primary transfer unit is detached from the apparatus main body, the link member is moved to the release position by the user pulling the grip in a direction toward a take-out port of the apparatus main body, such that all of the plurality of primary transfer rollers is shifted to respective separation positions where the plurality of primary transfer rollers is separated from the plurality of photoreceptors, and, after all of the plurality of primary transfer rollers has been shifted to the respective separation positions, the primary transfer unit is detached from the apparatus main body by the user further pulling the grip.

6. An image forming apparatus comprising:

a plurality of photoreceptors;

a primary transfer unit attachable to, and detachable from, an apparatus main body; and a unit lock that restricts the primary transfer unit from being detached from the apparatus main body, wherein:

the primary transfer unit includes:

a primary transfer belt to which toner images are transferred from the plurality of photoreceptors, a plurality of primary transfer rollers that are positioned, respectively, opposite the plurality of photoreceptors, with the primary transfer belt therebetween, and a contact and separation mechanism that brings the plurality of primary transfer rollers into contact with the plurality of photoreceptors and that separates the plurality of primary transfer rollers from the plurality of photoreceptors, the contact and separation mechanism includes:

a plurality of arm members that rotatably support the plurality of primary transfer rollers, respectively, a link member that shifts positions of the plurality of arm members by moving between different positions to bring the plurality of primary transfer rollers into contact with the plurality of photoreceptors and to separate the plurality of primary transfer rollers from the plurality of photoreceptors, the link member being movable back and forth in a direction perpendicular to an axial direction of the plurality of primary transfer rollers, and a grip to move the link member and detach the primary transfer unit from the apparatus main body, the grip being provided at one end of the link member, such that when a user moves, using the grip, the link member to a release position for separating all of the plurality of primary transfer rollers from the plurality of photoreceptors, the unit lock transitions from a locking state to an unlocking state, and the unit lock includes:

a locking hole provided in the apparatus main body, a lock pin provided on the primary transfer unit, the lock pin being movable back and forth to be engaged with the locking hole, and an urging member that urges the lock pin in such a direction as to separate the lock pin from the locking hole, wherein in conjunction with the user's operation of moving the link member to the release position, the urging member exerts an urging force to cause the unit lock to transition from the locking state to the unlocking state.

7. The image forming apparatus according to claim 6, wherein, when the primary transfer unit is detached from the apparatus main body, the link member is moved to the release position by the user pulling the grip in a direction toward a take-out port of the apparatus main body, such that all of the plurality of primary transfer rollers is shifted to respective separation positions where the plurality of primary transfer rollers is separated from the plurality of photoreceptors, and, after all of the plurality of primary transfer rollers has been shifted to the respective separation positions, the primary transfer unit is detached from the apparatus main body by the user further pulling the grip.

* * * * *